United States Patent
Hur et al.

(10) Patent No.: US 6,767,525 B2
(45) Date of Patent: Jul. 27, 2004

(54) METHOD FOR PREPARING MANGANESE-BASED NITRIDE HAVING NEARLY ZERO TEMPERATURE COEFFICIENT OF RESISTIVITY

(75) Inventors: Nam Hwi Hur, Daejeon (KR); Eun Ok Chi, Daejeon (KR); Wan Seop Kim, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 331 days.

(21) Appl. No.: 09/873,240

(22) Filed: Jun. 5, 2001

(65) Prior Publication Data

US 2002/0182136 A1 Dec. 5, 2002

(30) Foreign Application Priority Data

May 16, 2001 (KR) .......................................... 2001-26731

(51) Int. Cl.$^7$ .............................................. C01B 21/06
(52) U.S. Cl. ........................................................ 423/409
(58) Field of Search ............................................... 423/409

(56) References Cited

U.S. PATENT DOCUMENTS 4,515,763 A * 5/1985 Boudart et al. ............. 423/409
4,610,857 A * 9/1986 Ogawa et al. .............. 423/409

OTHER PUBLICATIONS

J.W. Liu et al, "Interaction of Manganese–Copper Solid Solutions with Nitrogen in the Range of 780–860° C," *Oxidation of Metals* (1991), 35(5–6), 397–404. (Abstract Only, no month).*

* cited by examiner

*Primary Examiner*—Wayne A. Langel
(74) *Attorney, Agent, or Firm*—Finnegan, Henderson, Farabow, Garrett & Dunner, L.L.P.

(57) ABSTRACT

The present invention relates to a method for preparing manganese-based nitride having nearly zero temperature coefficient of resistivity and more particularly, to the effective method for preparing manganese-based nitride expressed by the formula (1), wherein the manganese-based nitride, prepared by heating the stoichiometric mixture of $Mn_2N$ and Cu in an evacuated quartz tube, provides some advantages in that i) the use of the $Mn_2N$ compound as a reactant, the formation of impurities and nitrogen evaporation may be prevented, and ii) through nitrogen is tightly bonded between metals, the manganese-based nitride has extremely low (46 ppm/K) temperature coefficient of resistivity.

$$CuNMn_3 \qquad (1)$$

9 Claims, 2 Drawing Sheets

METHOD FOR PREPARING MANGANESE-BASED NITRIDE HAVING NEARLY ZERO TEMPERATURE COEFFICIENT OF RESISTIVITY

BACKGROUND OF THE INVENTION

Field of the Invention

The present invention relates to a method for preparing manganese-based nitride having nearly zero temperature coefficient of resistivity and more particularly, to the effective method for preparing manganese-based nitride expressed by the formula (1), wherein the manganese-based nitride, prepared by heating the stoichiometric mixture of $Mn_2N$ and Cu in an evacuated quartz tube, provides some advantages in that i) the use of the $Mn_2N$ compound as a reactant, the formation of impurities and nitrogen evaporation can be prevented, and ii) through nitrogen is tightly bonded between metals, the manganese-based nitride has extremely low (46 ppm/K) temperature coefficient of resistivity and a cubic antiperovskite structure.

$$CuNMn_3 \qquad (1)$$

Temperature coefficient of resistivity (TCR) is an index of the changes of resistance with temperature and is determined by measuring the incremental change in resistance of a resistive material with temperature change, $(1/R_0) \times (dR/dT)$, where $R_0$ is the initial resistance. When the TCR value is close to that of zero TCR material is typically less than 25 ppm/K, the resistance change is less than 0.25% with 100° C. of temperature difference.

Such materials having nearly zero TCR are widely used in the field of precision measurement and thin film resistor. Manganin, which is widely used as cryogenic resistor at very low temperature of 10 K, is an alloy comprised 84 wt. % of copper, 12 wt. % of Manganese-based and 4 wt. % of Nickel and used the most in precision measurement resistor. Manganin has about 20 ppm/K of resistance change with 10° C. of temperature difference.

However, this alloy film possesses intrinsic problems of rapid increase in surface resistance due to oxidation on metal surface and poor adhesion due to large structural strain.

SUMMARY OF THE INVENTION

As a result of intensive studies to develop the compound having low temperature coefficient of resistivity, low structural strain and stable in air, the inventors have completed by providing stable $CuNMn_3$ in air having a cubic antiperovskite structure.

An object of the invention is to provide a preparing method of manganese-based nitride having nearly zero temperature coefficient of resistivity which has more stability in air and higher adhesion then the metal alloy.

DETAILED DESCRIPTION OF THE INVENTION

Figure 1:
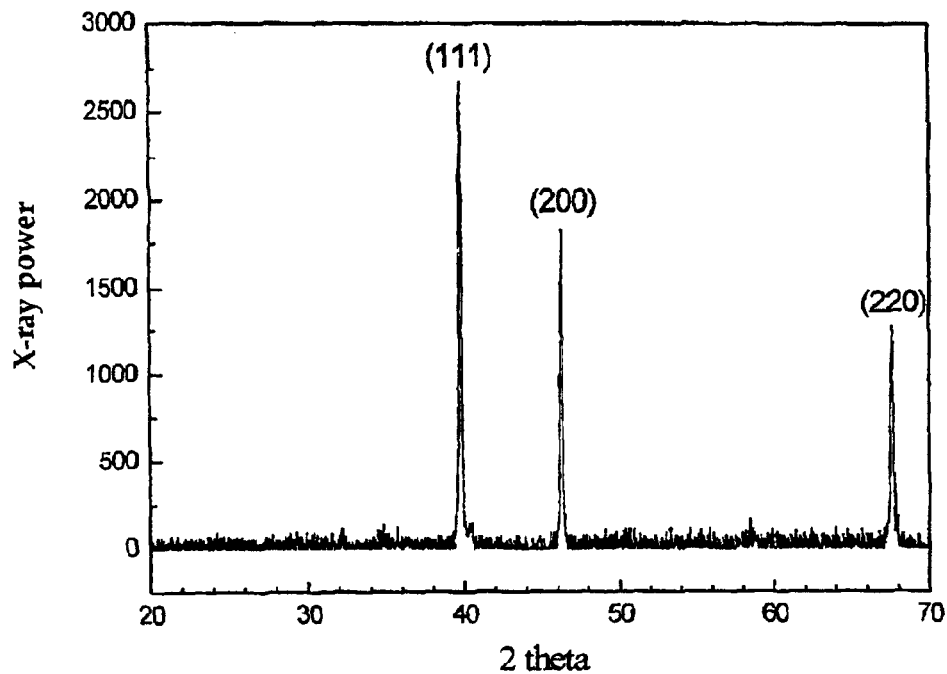
FIG. 1 is a graph showing X-ray powder diffraction patterns of $CuNMn_3$ according to the present invention.

The present invention is characterized by a method for preparing manganese-based nitride having a cubic antiperovskite structure, wherein the stoichiometric mixture of $Mn_2N$ and Cu is sintered at 800-900° C. for 40-60 hrs in an evacuated quartz tube to produce a manganese-based nitride expressed by the following formula (1).

$$CuNMn_3 \qquad (1)$$

The present invention is described in detail as set forth hereunder.

Reactants of the present invention are $Mn_2N$ and copper (Cu). The use of $Mn_2N$ compound promotes the formation of materials having desired antiperovskite structure and stability in air because nitrogen is tightly sorrounded between metals and thus, it cannot evaporate easily. And further, the use of $Mn_2N$ compound prevents from contamination of impurities. Amount of $Mn_2N$ is used in the molar ratio of 1.45-1.55 mole per mole of copper. If it deviated the molar ratio range of 1.45-1.55, the temperature coefficient of resistivity rapidly increase and the antiperovskite structure is not formed, respectively. The reaction of $Mn_2N$ and Cu is expressed in the following reaction formula 1.

Reaction Formula 1

$$1.5Mn_2N + Cu \rightarrow CuNMn_3$$

The preparing method of manganese-based nitride of the present invention is described in more detail hereunder.

All processes are carried in a dry box, being filled with argon gas so as to avoid any contact with air. A mixture of $Mn_2N$ powder and Cu powder according to stoichiometric ratio as in reaction formula 1, is placed in a dry box, weighted, mixed, ground and molded in the form of pellet and wrapped with tantalum foil. The pellet is placed into a quartz tube under vacuum. The air in the quartz tube was evacuated for 30 min and sealed with a torch. With a slow increase of temperature up to 800-900° C., the pellet in the quartz tube is sintered at the same temperature for 40-60 hrs to obtain $CuNMn_3$ having a cubic antiperovskite structure. If the temperature is lower than 800° C., it is impossible to obtain a cubic antiperovskite structure of $CuNMn_3$. On the other hand, in case of exceeding the temperature of 900° C., the antiperovskite structure becomes decomposed slowly. And further, if the sintered time deviates from the above range, the desired Cu—Mn alloy is not generated.

The method of the present invention minimizes the contamination of impurities by using $Mn_2N$ compound and provides excellent durability. The prepared $CuNMn_3$ is determined to have a cubic antiperovskite structure by X-ray powder diffractometer and 40-50 ppm/K of a temperature coefficient of resistivity and thus, it can be effectively utilized in thin film resistor due to excellent stability in air.

The following examples are intended to be illustrative for the present invention and should not be construed as limiting the scope of this invention defined by the appended claims.

EXAMPLE 1

Preparation of $CuNMn_3$ $Mn_2N$ (1.50 g) and Cu (0.513 g) were placed in a dry box, weighted, mixed and molded in the form of pellet. The mixture was then wrapped with tantalum foil, placed into a quartz tube and sealed under vacuum after evacuating the quartz tube for 30 min with vacuum pump. After the quartz tube was placed in an electric furnace of which temperature was raised to 800-900° C. with a rate of 50° C./h, the pellet was sintered at the same temperature for 50 hr. Then, the temperature of pellet was slowly cooled and taken out from the quartz tube to produce a black pellet of $CuNMn_3$.

The structure of $CuNMn_3$ was determined to be a cubic structure with space group Pm3m and a lattice parameter of a=3.90465(9) Å as displayed in FIG. 1.

Figure 2:
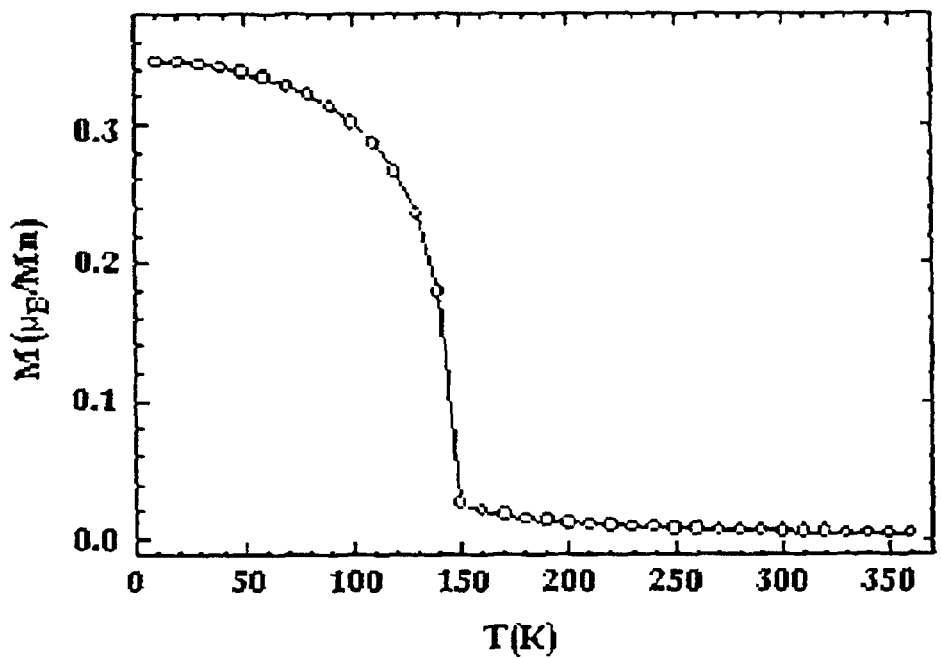
FIG. 2 is a graph showing the temperature dependent magnetization of $CuNMn_3$ according to the present invention.

The magnetization data as a function of temperature for $CuNMn_3$ was shown in FIG. 2, revealing a paramagnetic to ferromagnetic transition near 150K.

Figure 3:
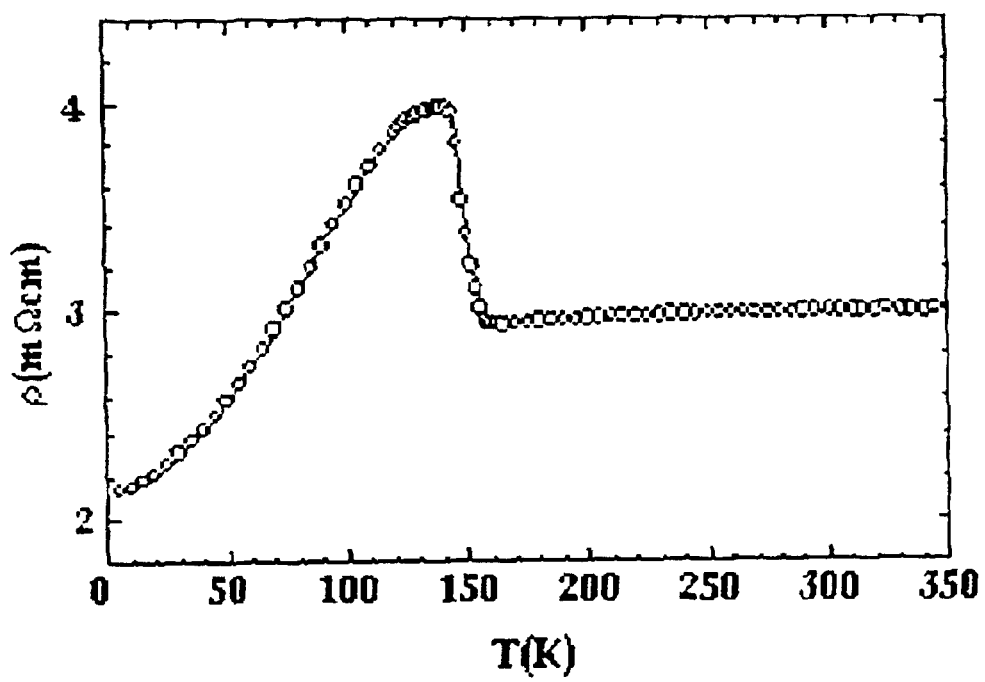
FIG. 3 is a curve showing the temperature dependent resistance with no magnetic field of $CuNMn_3$ according to the present invention.
Figure 4:
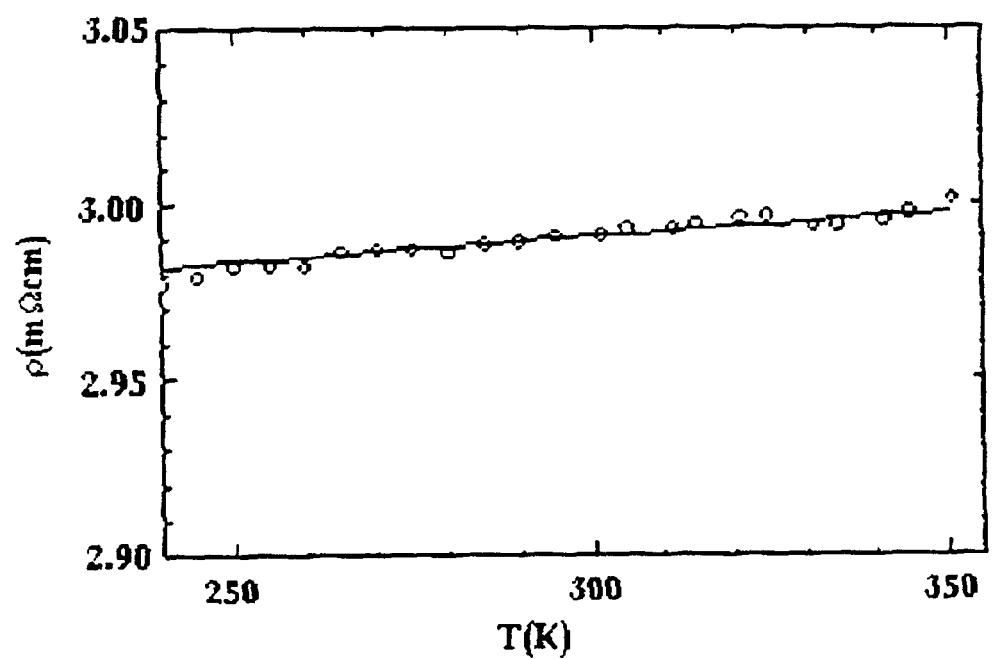
FIG. 4 is a curve showing the resistance change at a temperature from 250K to 350K of $CuNMn_3$ according to the present invention.

FIG. 3 shows the resistivity curve for $CuNMn_3$. The resistivity continuously increased with temperature up to 150K, exhibiting typical metallic character. Above this temperature, on the other hand, the resistivity data appeared to be nearly independent of temperature. The resistivity characteristic was shown clearly in FIG. 4 which was for extended region between 250 K to 350 K.

Comparative Example 1

Mn instead of $Mn_2N$ used in Example 1 and Cu (3:1) were mixed and sintered under $N_2$. The Cu—Mn alloy was prepared in the same manner as in Example 1.

Comparative Example 2

A final product was prepared in the same manner as in Example 1 except for raising temperature with a rate of 200° C./h instead of 50° C./h. As a result, the compound having an antiperovskite structure was produced with impurity of Cu—Mn alloy.

Comparative Example 3

A final product was prepared in the same manner as in Example 1 except for skipping of wrapping with tantalum foil. As a result, the compound having an antiperovskite structure was produced with impurity of Cu—Mn alloy.

Experimental Example resistivity

Determination of temperature coefficient of resistivity

After resistivity value of $CuNMn_3$ prepared in Example 1 was measured by standard four-probe method, temperature coefficient of resistivity was obtained from the equation of $(1/R0) \times (dR/dT)$ in the temperature range of 250 K to 350 K. The result was summarized in Table 1. Thermal expansion coefficients and temperature coefficients of resistivity of pure Cu, Al and manganin were also summarized in Table 1.

TABLE 1

| Category | Thermal expansion coefficient (1/K) | Temperature coefficient of resistivity (ppm/K) |
| --- | --- | --- |
| Example 1 | $1.77 \times 10^{-5}$ | 46 at 300 K |
| Manganin | — | 20 at 10 K |
| Copper (Cu)* | $1.68 \times 10^{-5}$ | 4360 at 300 K |
| Aluminum (Al)* | $2.44 \times 10^{-5}$ | 4430 at 300 K |

*Obtained from literature

As shown in Table 1, the manganese-based nitride prepared in Example 1 has lower temperature coefficient of resistivity than that of the conventional alloy in the wide range of room temperature. And further, the structure of manganese-based nitride of the present invention is much more stable in air compared to the conventional alloy because nitrogen is tightly bounded between metals.

The $CuNMn_3$ compound of the present invention having a cubic antiperovskite structure not only is thermally stable in air but also is difficult to be oxidized. Thus, the perovskite material can be useful in developing a wide range of hybrid materials combined with various perovskite oxides such as $Pb(Zr,Ti)O_3$(PZT).

What is claimed is:

1. A method for preparing managanese-based nitride the method comprising:

placing a mixture of $Mn_2N$ and Cu in a quartz tube;

evacuating the tube;

sealing the tube; and sintering the mixture at a temperature of from 800° C. to 900° C. to generate a manganese-based nitride having a cubic antiperovskite structure.

2. The method of claim 1, wherein $Mn_2N$ is included in the mixture in a molar ratio of 1.45–1.55 per mole of copper.

3. The method of claim 1, further comprising:

heating the mixture at a rate of 40–50° C./h after sealing the tube.

4. The method of claim 1, wherein said mixture is wrapped with tantalum foil before being placed into the quartz tube.

5. The method of claim 1, wherein the manganese-based nitride has the formula $CuNMn_3$.

6. The method of claim 1, wherein sintering the mixture is performed for a time of between 40 hours and 60 hours.

7. A manganese-based nitride of the formula $CuNMn_3$ and having a temperature coefficient of resistivity of 40–50 ppm/K and a cubic antiperovskite structure.

8. A manganese-based nitride material comprising:

copper, nitrogen, and manganese according to the formula, $CuNMn_3$;

wherein the material has a cubic antiperovskite structure; and wherein the material has a temperature coefficient of resistivity of between 40 ppm/K and 50 ppm/K over a temperature range of 160 K to about 350 K.

9. The manganese-based nitride material of claim 8, wherein the cubic antiperovskite structure of the material has a space group Pm3m and a lattice parameter of a=3.90465(9) Å.

* * * * *

UNITED STATES PATENT AND TRADEMARK OFFICE
CERTIFICATE OF CORRECTION

PATENT NO.   : 6,767,525 B2
DATED        : July 27, 2004
INVENTOR(S)  : Nam Hwi Hur, Eun Ok Chi and Wan Seop Kim It is certified that error appears in the above-identified patent and that said Letters Patent is hereby corrected as shown below:

Column 4,
Line 17, "managanese-based." should read -- manganese-based --
Line 52, delete "about".

Signed and Sealed this

Seventeenth Day of May, 2005

JON W. DUDAS
*Director of the United States Patent and Trademark Office*